United States Patent
Mulholland

(10) Patent No.: US 6,478,271 B1
(45) Date of Patent: Nov. 12, 2002

(54) MOUNTING SUCKER

(75) Inventor: Ian Mulholland, Andover (GB)

(73) Assignee: Free-Free Industrial Corporation, Taipei (TW)

( * ) Notice: Subject to any disclaimer, the term of this patent is extended or adjusted under 35 U.S.C. 154(b) by 0 days.

(21) Appl. No.: 09/922,711

(22) Filed: Aug. 7, 2001

(51) Int. Cl.[7] .......................... A45D 42/14; F16B 47/00
(52) U.S. Cl. ............................. 248/205.8; 248/206.2; 248/683
(58) Field of Search .................. 248/205.8, 205.5, 248/206.2, 205.7, 206.3, 206.4, 206.1, 683, 467, 362, 363; 294/64.1

(56) References Cited

U.S. PATENT DOCUMENTS

| | | | | |
|---|---|---|---|---|
| 952,495 A | * | 3/1910 | Austin | 248/205.8 |
| 2,233,870 A | * | 3/1941 | Muter | 248/205.8 |
| 2,568,714 A | * | 9/1951 | Britton | 248/683 |
| 2,657,893 A | * | 11/1953 | Puckert | 248/205.8 |
| 2,940,713 A | * | 6/1960 | Dusen | 248/205.8 |
| 4,133,575 A | * | 1/1979 | Mader | 248/205.8 |
| 5,348,168 A | * | 9/1994 | Emery | 248/206.3 |
| 6,045,111 A | * | 4/2000 | Hsieh | 248/551 |
| 6,170,894 B1 | * | 1/2001 | Baker et al. | 294/64.1 |

* cited by examiner

*Primary Examiner*—Ramon O. Ramirez
*Assistant Examiner*—Gwendolyn Baxter
(74) *Attorney, Agent, or Firm*—Fei-Fei Chao; Venable, Baetjer, Howard & Civiletti, LLP

(57) ABSTRACT

A mounting sucker is adapted to be mounted on a smooth surface and composed of a suction devices (10), an intermediate member (20), and a rotating boss (30). When the rotating boss (30) is rotated, the central part of the suction devices (10) is pulled away from the smooth surface, creating a partial vacuum space. The intermediate member (20) pushes down on peripheral edges of the suction devices (10). An outer periphery of the rotating boss (30) extends beyond the range of the suction devices (10) so that the outer periphery of the rotating boss (30) can contact the smooth surface and transmit force from an object suspended on the mounting sucker.

11 Claims, 5 Drawing Sheets

MOUNTING SUCKER

BACKGROUND OF THE INVENTION

1. Field of the Invention

The present invention relates to a mounting sucker, and more particularly to a mounting sucker with a threaded device to increase suction force.

2. Description of Related Art

With reference to FIG. 5, in one known arrangement, a suction pad (80) is integrally formed with a suction dome (81) to which other structures, such as cabinets, selves, towel hanger etc. can be attached. The suction pad (80) is typically made of a resilient material such as PVC and is slightly dome-shaped so that when the suction pad (80) is pressed into contact with smooth surfaces, its inherent resilience causes the central part to draw away from the smooth surfaces, thereby creating a partial vacuum between the suction pad (80) and the surface. Such a mounting means has a fatal disadvantage in that only a limited amount of resilience can be built into the design so that only weak fixing force can be obtained.

Another known mounting means, as shown in FIGS. 6 and 7, comprises a suction pad (90) as described above which is actuated by a lever (93) and cam arrangement (94). One end of the lever (93) is attached to a pulling means (931) for drawing the suction pad (90) away from the wall. The pulling means (931) projects through an intermediate member (91), whose center is raised away from suction pad (90). The lever (93) has a fulcrum part which bears against the intermediate member (91). When the end of lever (93) is pressed down, the lever (93) rotates about the fulcrum and the pulling means (931) pulls the center of the suction pad (90) away from the smooth surface. This design has the additional advantage that the amount of the pull which can be obtained is not dependent upon the material of which suction pad (90) is made. Further, as the lever (93) presses the intermediate member (91) down, the intermediate member (91) forces the circumference of the suction pad (90) into closer contact with the smooth surface thereby giving a better seal.

There are, however, two problems with this known arrangement. In particular, the lever arrangement is complex to produce, relatively unsightly and may only be used to apply one level of force to the suction pad.

The present invention has arisen to mitigate and/or obviate the disadvantages of the conventional mounting means.

SUMMARY OF THE INVENTION

The main objective of the present invention is to provide a mounting sucker that is firmly securable on a smooth surface but easily operated.

Further benefits and advantages of the present invention will become apparent after a careful reading of the detailed description with appropriate reference to the accompanying drawings.

DETAILED DESCRIPTION OF THE INVENTION

Figure 1:
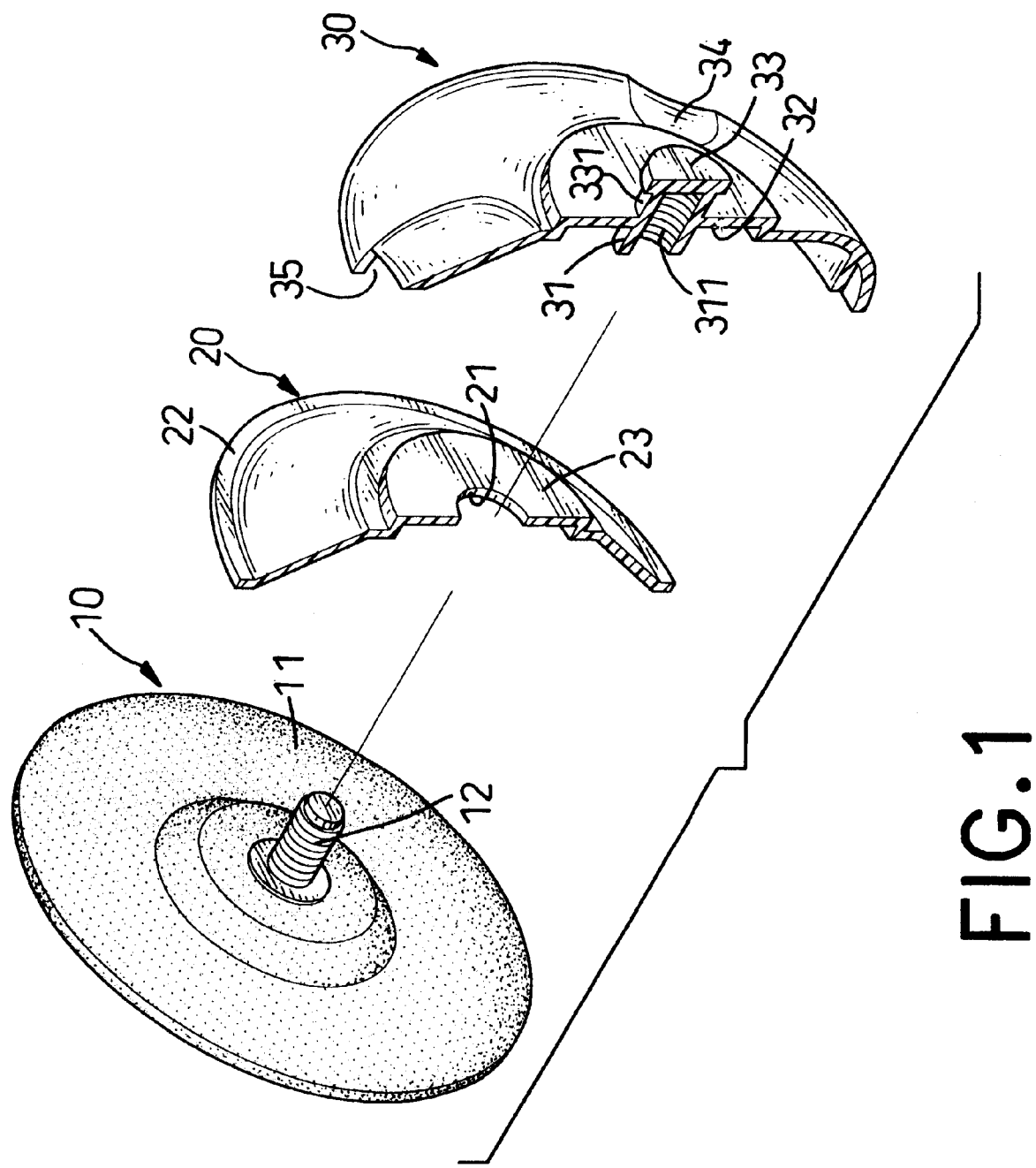
FIG. 1 is an exploded perspective view of a mounting sucker in accordance with the present invention.
Figure 2:
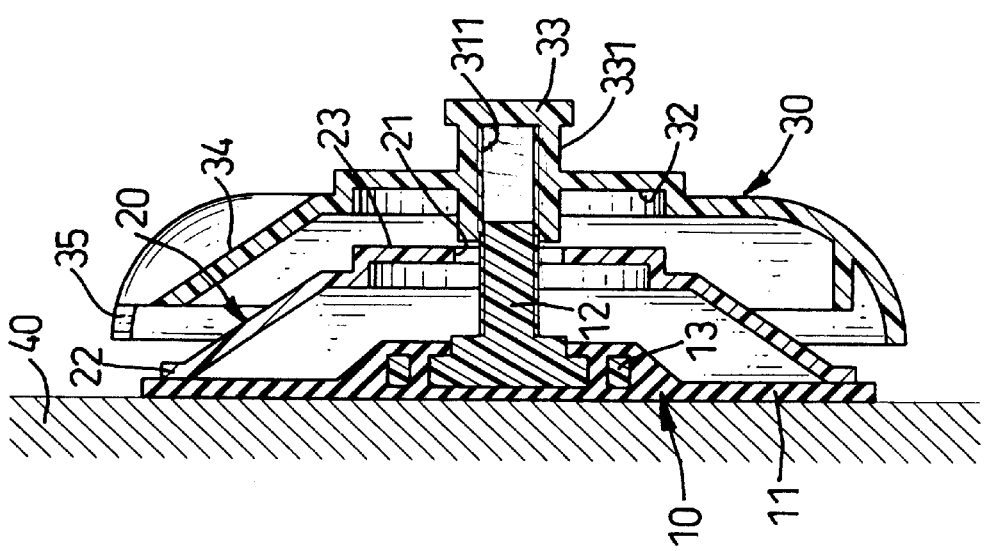
FIG. 2 is a side cross-sectional view of the mounting sucker when the mounting sucker is initially attached to a smooth surface.

With reference to FIGS. 1 and 2, a mounting sucker adapted to connect with hanging racks is composed of a suction device (10), an intermediate member (20), and a rotating boss (30) for use with a smooth surface.

The suction device (10) has a circular suction pad (11) made of soft flexible plastic material such as polyvinyl chloride (PVC) and a threaded projection (12) made of hard plastic material erected at the center of the suction pad (11). A plate (13) is secured at a root of the threaded projection (12) to provide a powerful connecting strength. The intermediate member (20) mounted on the suction device (10) is a shallow dome substantially having the same size as the suction pad (11) of the suction device (10). The intermediate member is made of hard plastic and has a bore (21) formed in the center of the intermediate member (20). A pressing edge (22) is formed around the circumference of the intermediate member (20) and adapted to evenly press the suction pad (11). Additionally, an annular bearing zone (23) is shaped around the bore (21) to provide a regular compression to the suction pad (11) when the rotating boss (30) as described later.

The rotating boss (30) is a dome made of hard plastic and caps the intermediate member (20) and the suction device (10). A tube (31) with an open first end, a closed second end, and a screw thread bore (311) is formed in the center of the rotating boss (30). The first end of the tube (31) penetrates the bore (21) of the intermediate member (20) and receives the threaded projection (12) of the suction device (10). An annular recess (32) is defined around the fast end of the tube (31) and receives the annular bearing zone (23) of the intermediate member (20). A bushing head (33) with a neck (331) is formed on the closed second end of the tube (31) to adapt to connect with hanging racks (not shown), such as soap racks, brackets, hanging rings of tools, etc. Multiple scalloped concavities (34) are defined in an outer surface of the rotating boss (30) to make mounting means to be turned easily. Multiple cutouts (35) are defined in the scalloped concavities (34) respectively so that a seal between the suction pad (11) and the smooth surface can be broken if necessary.

Figure 3:
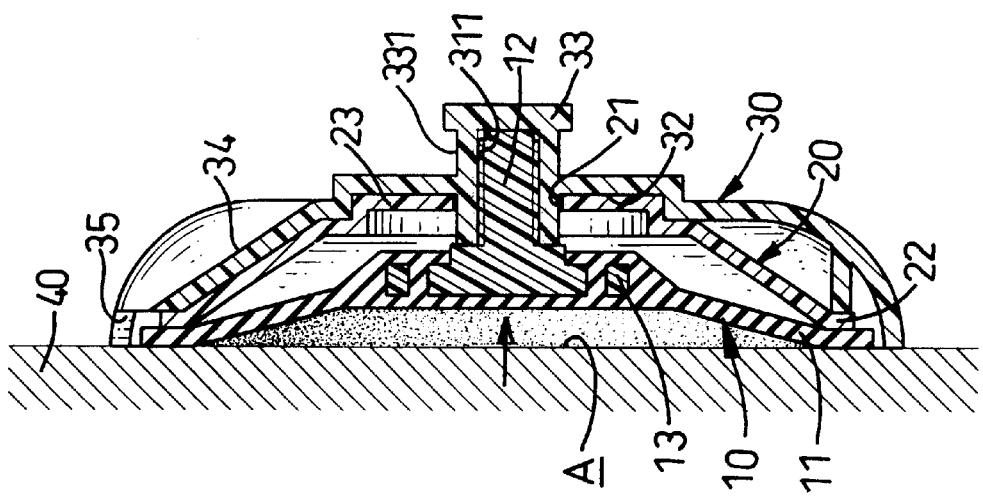
FIG. 3 is a side cross-sectional view of the mounting sucker showing that the mounting sucker is secured on the smooth surface after operating a rotating boss.

FIGS. 2 and 3 show the mounting sucker in use. The suction pad (11) is placed in contact with a suitable surface (40) initially as shown in FIG. 2. The suction pad (11) is adhered to the surface (40) and the rotating boss (30) is in a first position spaced away from the intermediate member (20) so that the mounting sucker is lightly attached to the surface (40). When the rotating boss (30) is turned by a user to move via the threaded engagement between the threaded projection (12) and the screw thread bore (311) to a second position wherein the rotating boss (30) is close to the intermediate member (20), a force from the rotating boss (30) is transferred to the intermediate member (20) through the annular bearing zone (23). Therefore, the pressing edge (22) of the intermediate member (20) presses the circumferential edge of the suction pad (11) to enhance the sealing efficiency.

In another aspect, the engagement of the threaded projection (12) and the tube (31) of the rotating boss (30) draws up the center of the suction pad (11) in the direction shown in the arrow. A partial vacuum space (A) (see FIG. 3) is spaced and attracts the mounting means by different atmosphere pressure between the space (A) and the outer surrounding whereby improving and prolonging the adhesive force.

Figure 4:
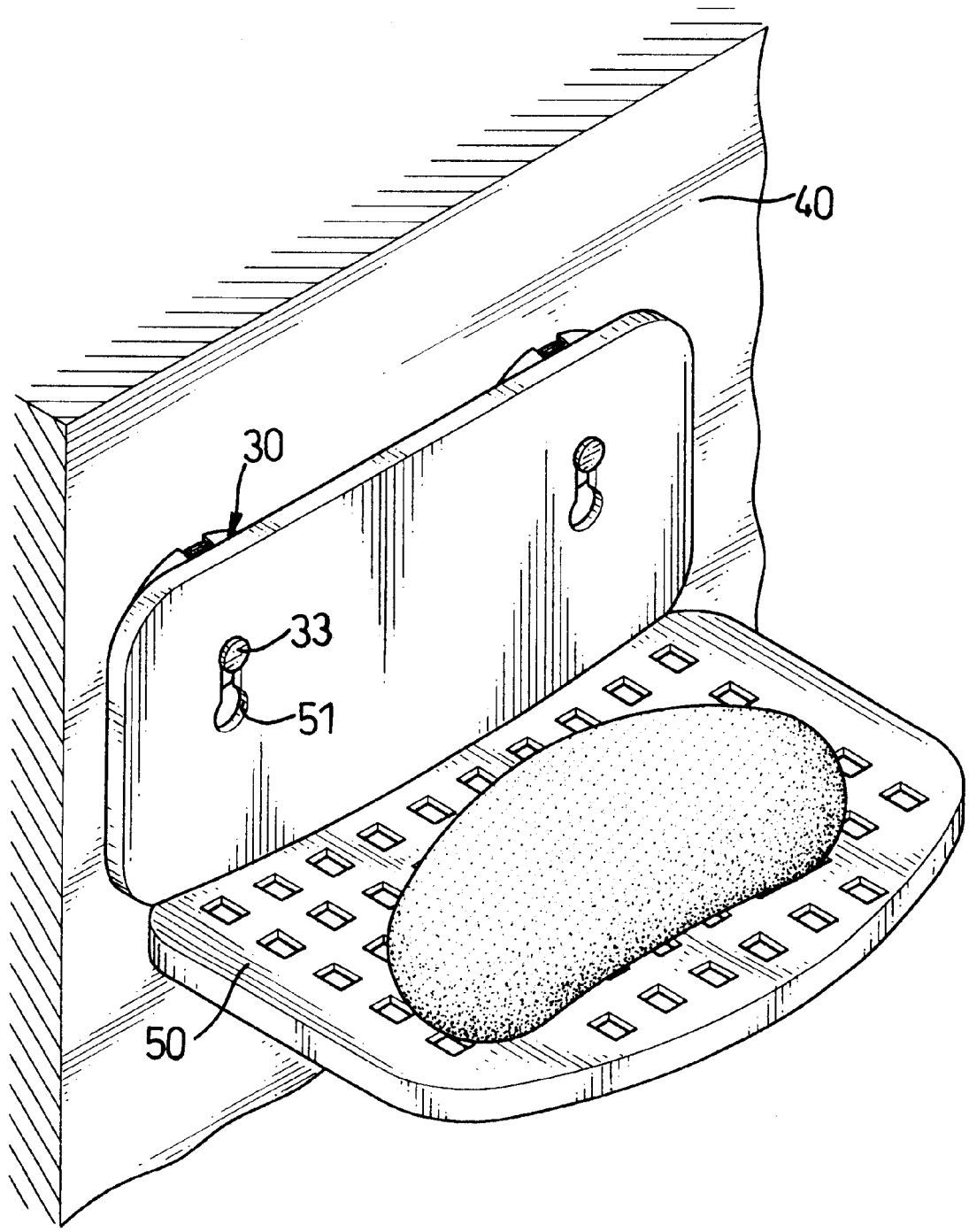
FIG. 4 is a schematic perspective view of the mounting sucker applied to a soap rack.
Figure 5:
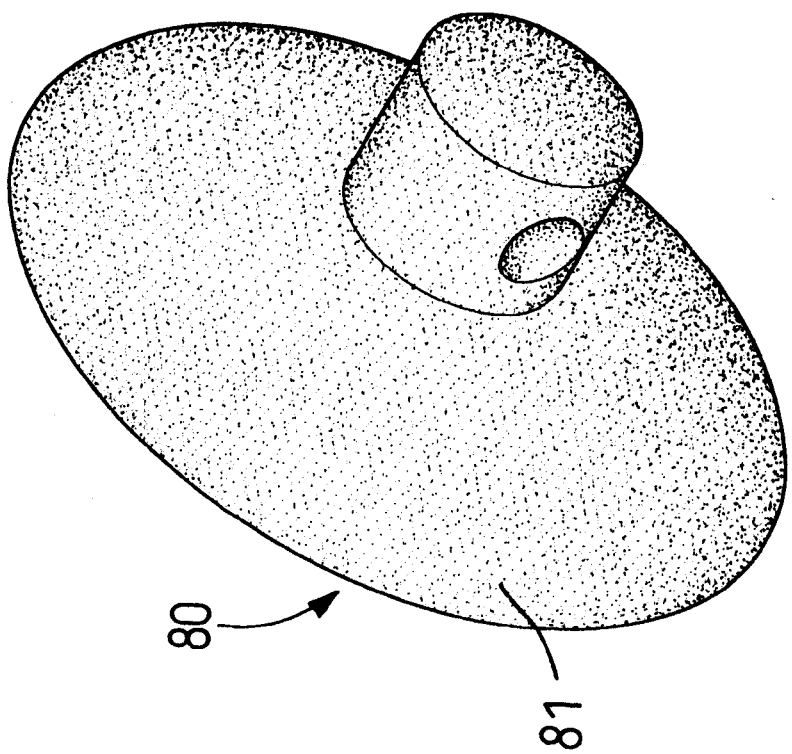
FIG. 5 is a perspective view of a conventional mounting sucker.
Figure 6:
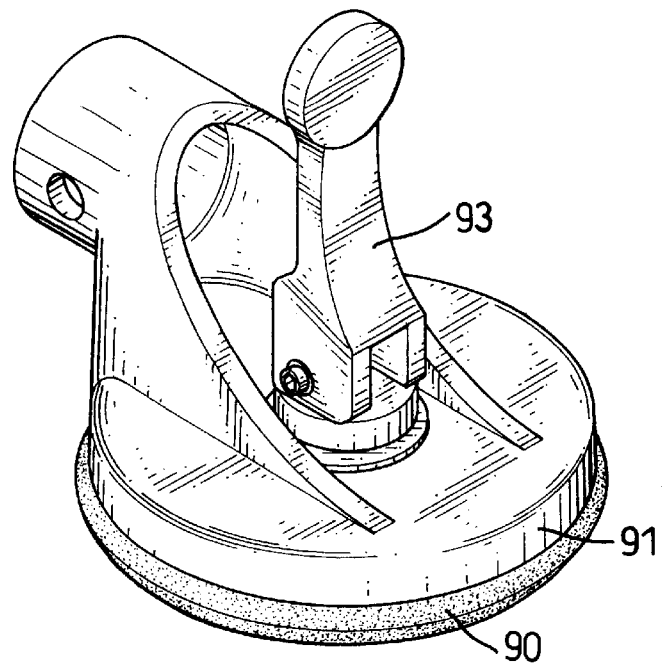
FIG. 6 is a perspective view of another conventional mounting sucker which is operated by a lever.
Figure 7:
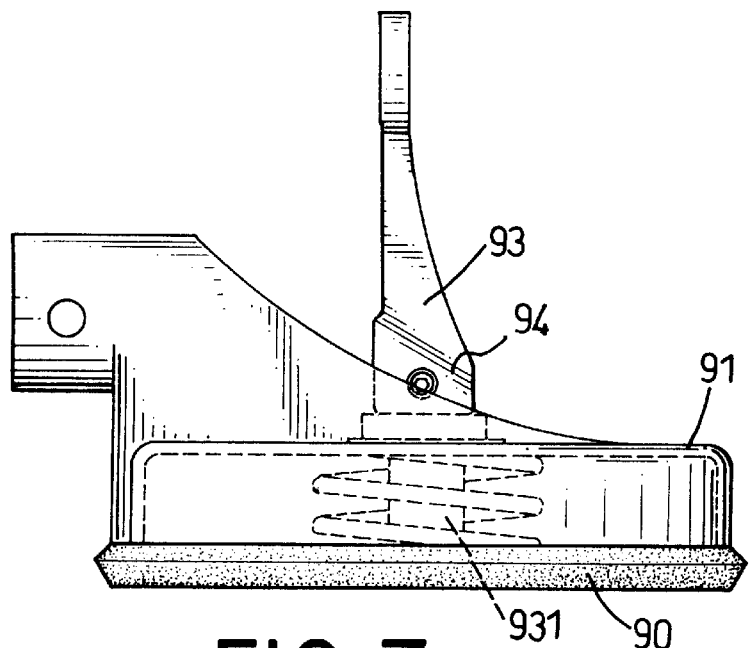
FIG. 7 is a side cross-sectional view of the conventional mounting sucker in accordance with FIG. 6.

Now referring to FIG. 4, one embodiment shows a pair of the mounting suckers according to the present invention mounted on the smooth surface (40). A soap rack (50) is suspended by the bushing head (33) of the mounting means. When in position, the soap rack (50) extends for 10 cm or more from the smooth surface (40) in the horizontal direction. The rack comprises a pair of keyhole-shaped slots (51) and each slot (51) has a lower part of a diameter sufficiently large for passing over the largest diameter of the bushing head (33) of the rotating boss (30) and a narrow part having a width smaller than the largest diameter of the bushing head (33) but bigger than a width of the neck (331) of the bushing head (33). As a result, the slot (51) can be passed over the bushing head (33) until it comes to rest firmly held on the neck (331) of the bushing head (33), whereby the soap rack (50) is suspended on the smooth surface (40).

Additionally, the rotating boss (30) has an outer peripheral edge extending beyond an outer edge of the suction pad (11) of the suction devices (10) so that the outer periphery edge of the rotating boss (30) touches the smooth surface (40). Thus, particularly when the rack (50) is heavy due to soap therein, an oblique force from the rack which would other break the seal at the top of the suction pad (11) is countered by the contact of the periphery edge of the rotating boss (30) and the surface (40). Whereby a twisting force from the suspended soap rack (50) with weighted soap is transmitted to the suction pad (11) and the seal is preserved. In this way, the breaking of the suction at the top can be avoided.

The mounting sucker of the present invention can be used for engagement with any suitable surface. Preferably, the surface is of the types found in kitchen and bathroom for example gloss painted surface, metal surfaces such as aluminum or steel, glass or glazed surface such as tiles, or plastic such as Perspex™ or PVC.

Although the invention has been explained in relation to its preferred embodiment, it is to be understood that many other possible modifications and variations can be made without departing from the spirit and scope of the invention as hereinafter claimed.

What is claimed is:

1. A mounting sucker comprising:
   a suction device (10) adapted for sealingly contacting a smooth surface, wherein the suction device (10) is composed of:
      a suction pad (11) contacting the smooth surface to form a seal between the suction pad (11) and the smooth surface; and
      a threaded projection (12) erected on the suction pad (11);
   an intermediate member (20) mounted the suction device (10) and having a pressing edge (22) formed around the circumference of the intermediate member (20) to evenly press the suction pad (11) so as to make the suction device (10) firmly attach to the smooth surface; and
   a rotating boss (30) adapted to connect with a hanging rack and capping the intermediate member (20) and the suction device (10), the rotating boss (30) having:
      a tube (31) formed in the center of the rotating boss (30) to movably penetrate the intermediate member (20) and having a screw thread bore (311) to receive the threaded projection (12) of the suction device (10); and
      a bushing head (33) formed outwardly on the rotating bass (30) to adapt to connect with hanging racks;
   wherein in a first position the intermediate member (20) is spaced away from the rotating boss (30) and the suction device (10) is close to the smooth surface (40), and in a second position the intermediate member (20) is drawn close to the rotating boss (30) and the suction device (10) is spaced away from the smooth surface so that a partial vacuum is created between the suction device (10) and the smooth surface for sealing attachment.

2. The mounting sucker as claimed in claim 1, wherein the rotating boss (30) is a shallow dome and has multiple scalloped concavities (34) defined in an outer surface of the rotating boss (30) to make mounting means to be turned easily.

3. The mounting sucker as claimed in claim 2, wherein the rotating boss (30) further comprises multiple cutouts (35) defined in distal ends of the scalloped concavities (34) respectively so that the seal between the suction pad (11) and the smooth surface is broken easily if necessary.

4. The mounting sucker as claimed in claim 2, wherein the intermediate member (20) further comprises an annular bearing zone (23) at a center of the intermediate member (20), the annular bearing zone (23) transfers an even compression from the rotating boss (30) to the suction device (10) when the rotating boss (30) screws toward the smooth surface (40).

5. The mounting sucker as claimed in claim 2, wherein the suction device (10) further comprises a plate (13) secured at a root of the threaded projection (12) to provide a connecting strength between the suction pad (11) and the threaded projection (12) to avoid breakage therebetween.

6. The mounting sucker as claimed in claim 1, wherein the rotating boss (30) further comprises multiple cutouts (35) defined in an outer surface of the rotating boss (30) so that the seal between the suction pad (11) and the smooth surface is broken easily if necessary.

7. The mounting sucker as claimed in claim 6, wherein the intermediate member (20) further comprises an annular bearing zone (23) at a center of the intermediate member (20), the bearing zone (23) transfers an even compression from the rotating boss (30) to the suction device (10) when the rotating bass (30) screws toward the smooth surface (40).

8. The mounting sucker as claimed in claim 6, wherein the suction device (10) further comprises a plate (13) secured at a root of the threaded projection (12) to provide a connecting strength between the suction pad (11) and the threaded projection (12) to avoid breakage therebetween.

9. The mounting sucker as claimed in claim 1, wherein the intermediate member (20) further comprises an annular bearing zone (23) at a center of the intermediate member (20), the annular bearing zone (23) transfers an even compression from the rotating boss (30) to the suction device (10) when the rotating boss (30) screws toward the smooth surface (40).

10. The mounting sucker as claimed in claim 9, wherein the suction device (10) further comprises a plate (13) secured at a root of the threaded projection (12) to provide a connecting strength between the suction pad (11) and the threaded projection (12) to avoid breakage therebetween.

11. The mounting sucker as claimed in claim 1, wherein the suction device (10) further comprises a plate (13) secured at a root of the threaded projection (12) to provide a connecting strength between the suction pad (11) and the threaded projection (12) to avoid breakage therebetween.

* * * * *